UNITED STATES PATENT OFFICE.

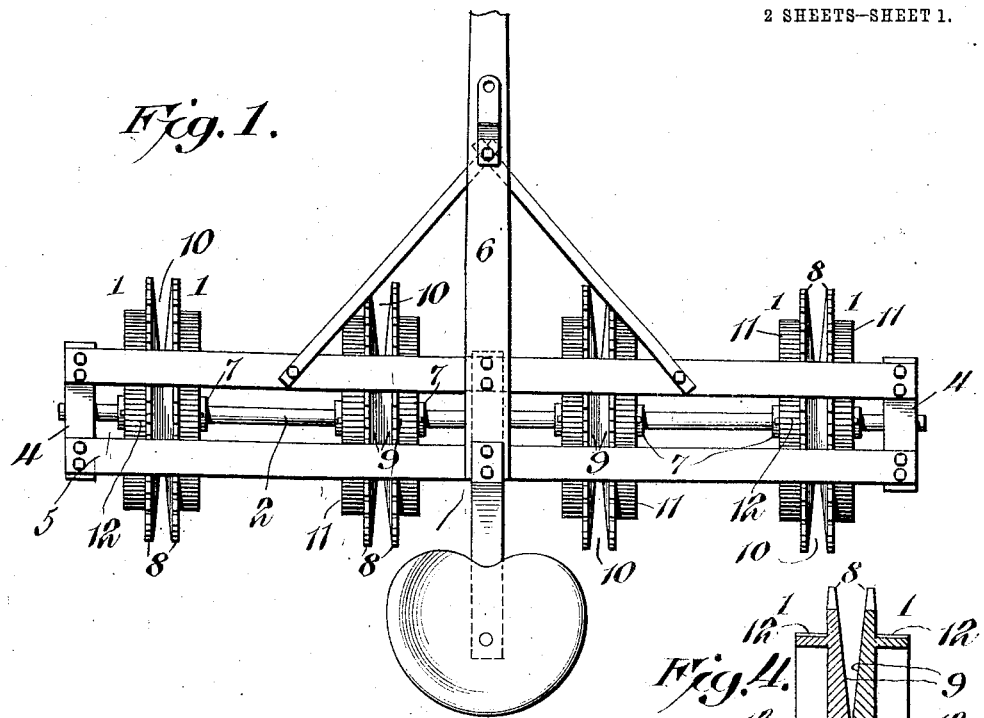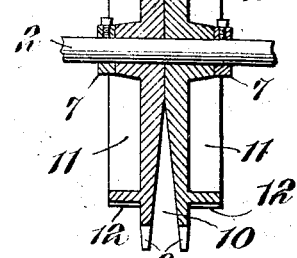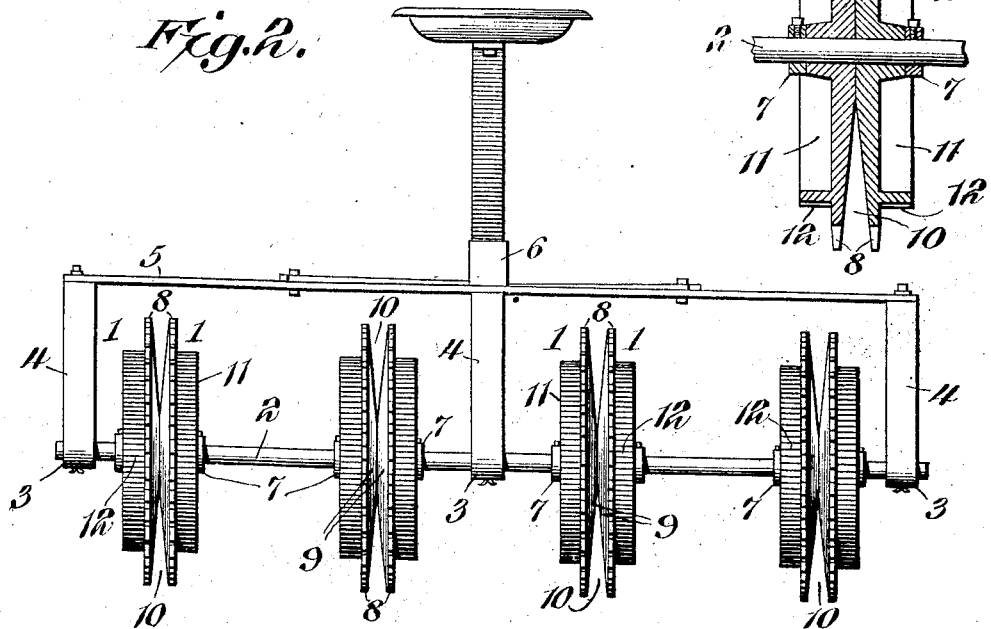

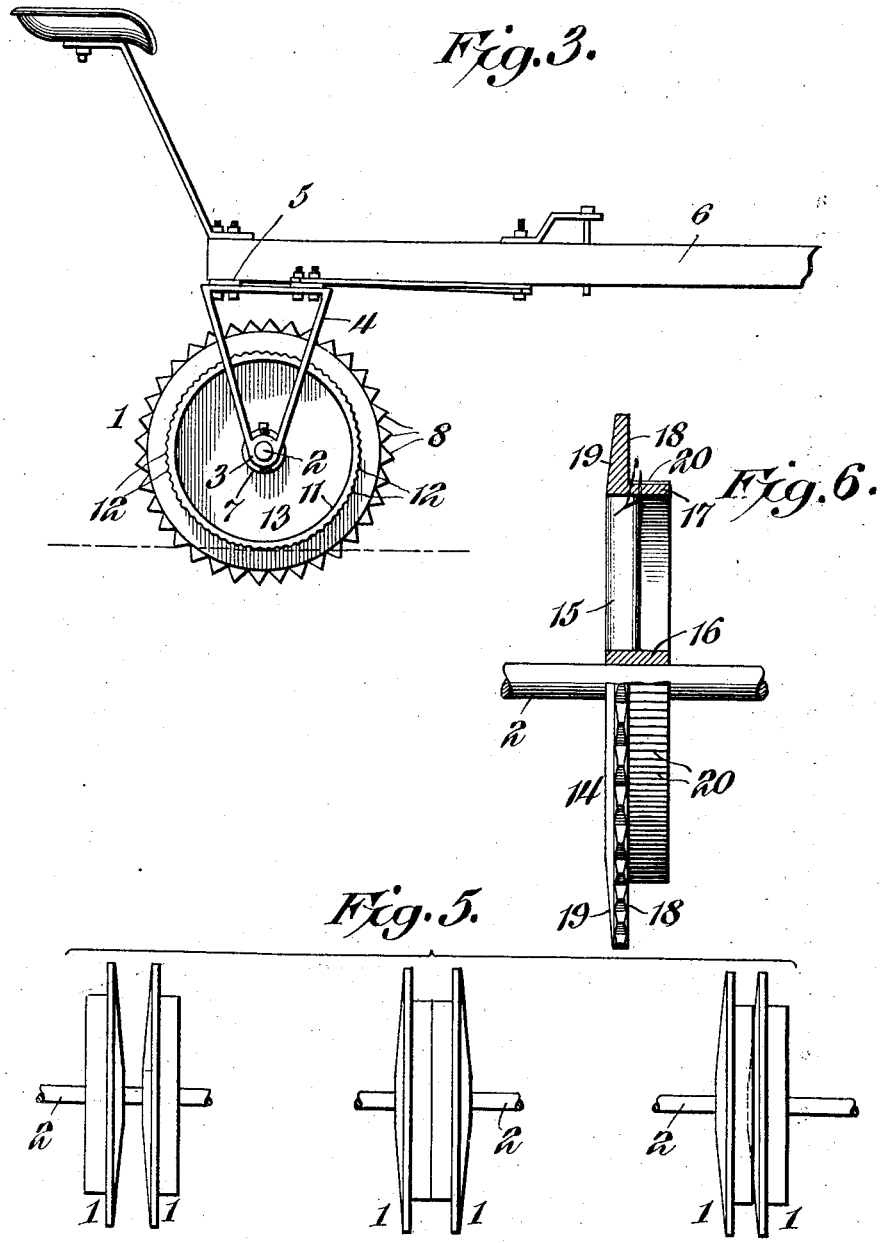

JOHN WYSS, OF JOHNSTOWN, COLORADO.

HARROW.

1,072,292.

Specification of Letters Patent. Patented Sept. 2, 1913.

Application filed March 10, 1913. Serial No. 753,378.

*To all whom it may concern:*

Be it known that I, JOHN WYSS, a citizen of the United States, residing at Johnstown, in the county of Weld and State of Colorado, have invented a new and useful Harrow, of which the following is a specification.

The invention relates to improvements in harrows.

When immediately after planting rain falls and is followed by warm weather, the surface of the ground crusts and the natural healthy development of the young plants is materially interfered with. Little beet and other plants, which at this stage are exceedingly tender and weak, curl up under such a crust and die. Also through this crusting of the earth, air and sunshine are entirely shut off from the soil below the crust and the growth of the plants from this cause is very materially affected. This evil, viz., the crusting of the soil, has been largely dealt with by the use of rollers and harrows, and while much of a crop is thereby saved many plants are crushed by rollers or torn out by harrows.

The object of the present invention is to provide a harrow or cultivator, designed particularly for breaking the crust around young and tender plants, and adapted to straddle a plurality of rows, and capable of effectively breaking the crust without disturbing the plants.

It is also an object of the invention to provide a machine of this character, which will leave the crust unbroken between the rows to enable such crust to be utilized for preventing the growth of weeds and other objectionable vegetation.

A further object of the invention is to provide a harrow or crust breaking implement, adapted to be constructed in various sizes to enable it to operate on any desired number of rows and to meet the requirements and suit different conditions to permit it to be advantageously employed either by the large farmer, or the small truck gardener.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a crust breaking harrow, constructed in accordance with this invention. Fig. 2 is a rear elevation of the same. Fig. 3 is a side elevation of the harrow. Fig. 4 is a transverse sectional view through one pair of crust breaking wheels. Fig. 5 is a diagrammatic view, illustrating several different ways of spacing the crust breaking wheels. Fig. 6 is an enlarged detail view partly in section, illustrating another form of the crust breaking wheels.

Like numerals of reference designate corresponding parts in all the figures of the drawings.

In the accompanying drawings in which is illustrated the preferred embodiment of the invention, 1—1 designate crust breaking wheels arranged in pairs and mounted on a transverse shaft 2, which is journaled in suitable bearings 3 of depending standards 4 of a harrow or cultivator frame 5.

The harrow or cultivator frame 5, which is equipped with a suitable tongue or pole 6, may be of any desired construction, and as the particular form or construction thereof does not constitute a portion of the present invention, further description thereof is deemed unnecessary.

The cultivator or harrow is designed for use for breaking the crust around all kinds of plants, which are arranged in rows, and for breaking the crust at each side of the rows, the wheels 1 are arranged in pairs and are adapted to straddle the rows. The transverse shaft may be equipped with any desired number of pairs of wheels, which are secured at proper spaced points to suit the width of the rows by adjustable set collars 7, arranged on the shafts at the outer sides of each pair of wheels 1 and adapted to enable the pairs of wheels to be arranged to suit the different spacing of the rows of different crop plantings.

Each crust-breaking wheel, which is constructed of cast iron or other suitable material, is provided at its peripheral edge with a circumferential series of projecting teeth 8, preferably arranged with their points approximately two inches apart. These teeth, which are designed to be approximately one half an inch thick, are about an inch in length and are tapered to a rather sharp edge.

The body of the wheel 1 increases in thickness at one side face from the periphery to the center of the wheel, and at that side it forms a tapered projecting portion or enlargement 9, adapted to fit against the tapered enlargement of the adjacent coacting wheel, the two enlargements forming an intervening inwardly tapered plant receiving space 10 to enable the wheels to straddle a row and travel at opposite sides thereof and break the crust at each side of the row without disturbing the plants thereof.

The body of the wheel may be either solid, as shown, or spoked, and it is provided at its outer side with an annular horizontally projecting rim or flange 11, arranged to run on the ground and adapted to prevent the wheel from sinking too deeply into the same when the soil is either too light or too wet. The outwardly projecting annular flange or rim, which limits the penetration of the peripheral portion of the wheel, is preferably provided with transverse corrugations 12, extending entirely across the rim in parallelism with the axis of the wheel, and adapted to break or pulverize the crust a suitable distance at each side of the row. The crust is left unbroken or intact between the spaced pairs of wheels to enable it to be utilized for preventing the growth of weeds and grass. The unbroken crust in the spaces between the rows has been found exceedingly effective for smothering such undesirable vegetation. The outer side face 13 of the wheel from which the flange or rim 11 projects is flat, and the said annular rim may be made of any width so as to project the desired distance from the outer side of the wheel to pulverize the crust over the desired area. As the plants increase in size, the members of each pair of wheels may be spaced apart, as illustrated at the left hand side of Fig. 5 of the drawings, and they are also susceptible of being arranged with one or two flanges between the peripheral projecting teeth, as illustrated at the right hand side of Fig. 5, and at the center thereof when it is desired to provide a harrow for general harrow work and not for straddling the rows of plants under cultivation.

In Fig. 6 of the drawings is illustrated another form of the invention, in which the crust breaking wheel 14 is provided with spokes 15, extending from the hub 16 to the rim 17 of the wheel. The peripheral projecting toothed portion 18 has a flat outer side face and is tapered to present an angularly disposed inner face 19. The annular flange or rim 17, which extends horizontally from the flat face 18, is designed to be provided with transverse corrugations 20, extending entirely across the rim and adapted to pulverize the crust in the manner heretofore described.

What is claimed is:—

1. A crust breaking harrow of the class described including wheels provided with peripheral teeth and adapted to be arranged to straddle a row of plants and provided with projecting annular rims or flanges having exterior corrugations arranged to pulverize the crust.

2. A crust breaking harrow of the class described including wheels provided with peripheral teeth and adapted to be arranged to straddle the rows of plants and provided with projecting annular rims or flanges having transverse corrugations extending entirely across the rims or flanges in substantial parallelism with the axis of the wheels.

3. A crust breaking harrow of the class described including a pair of contiguous wheels having at their outer faces crust breaking means and provided at their inner faces with enlargements formed by tapering the body portions of the wheels in thickness from the center outwardly, said enlargements being arranged opposite each other and forming a relatively narrow tapering space between them to enable the wheels to straddle a row of young plants.

4. A crust breaking harrow of the class described including a wheel comprising a body portion having a flat side face and tapered in thickness from the center to the periphery to form a laterally projecting tapering enlargement at the opposite side face adapted to be arranged opposite the tapered portion of a similar wheel to form an intervening inwardly tapered plant receiving space, said wheel being provided with peripheral teeth and having an annular flange or rim extending from the flat face of the wheel and arranged to limit the penetration of the wheel.

5. A crust breaking harrow of the class described including a wheel comprising a body portion having a flat side face and tapered in thickness from the center to the periphery to form a laterally projecting tapering enlargement at the opposite side face adapted to be arranged opposite the tapered portion of a similar wheel to form an intervening inwardly tapered plant receiving space, said wheel being provided with peripheral teeth and having an annular flange or rim extending from the flat face of the wheel and arranged to limit the penetration of the wheel and provided with exterior corrugations arranged to pulverize the crust.

6. A crust breaking harrow wheel having a hub provided with an annular rim extending from the side of the wheel at an intermediate point between the periphery and the hub of the wheel and located adjacent to the said periphery and having exterior corrugations arranged to pulverize the crust.

7. A crust breaking harrow wheel provided with an annular rim extending from the side of the wheel at an intermediate point between the periphery and the hub of the wheel and located adjacent the said periphery and having transversely disposed corrugations extending entirely across its outer face and arranged to pulverize the crust.

In testimony, that I claim the foregoing as my own, I have hereto affixed my signature in the presence of two witnesses.

JOHN WYSS.

Witnesses:
T. H. HILL,
H. A. CLINGENPEEL.

Copies of this patent may be obtained for five cents each, by addressing the "Commissioner of Patents, Washington, D. C."